May 20, 1958 O. W. BARKER ET AL 2,835,172
ROTARY HEAD MILLING ATTACHMENT
Filed Jan. 13, 1955 4 Sheets-Sheet 1

INVENTORS
Orrin W. Barker, Ralph E. Saving,
and Lloyd D. Libby
BY
Elroy J. Wutschel
Attorney

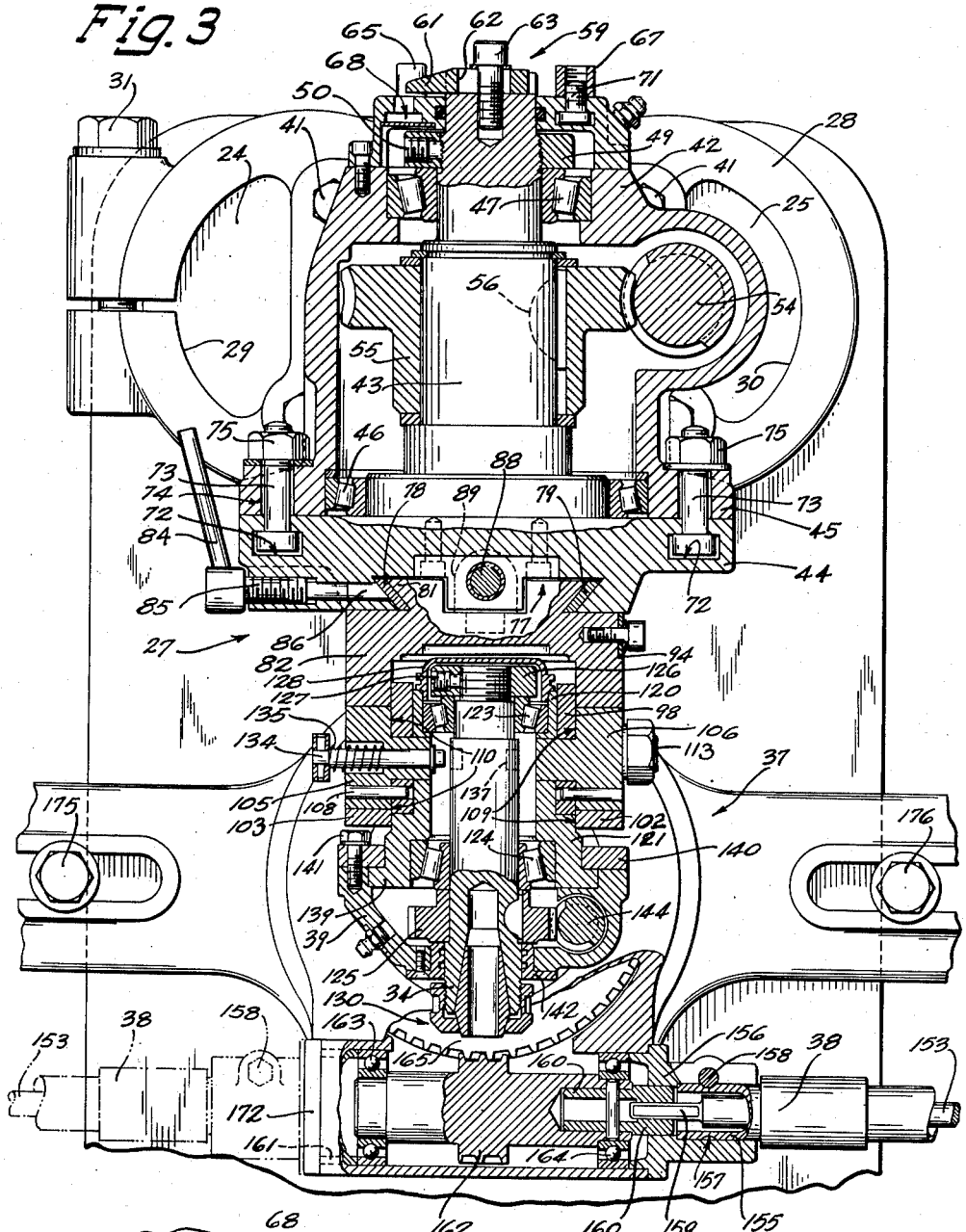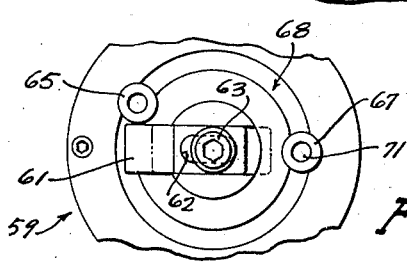

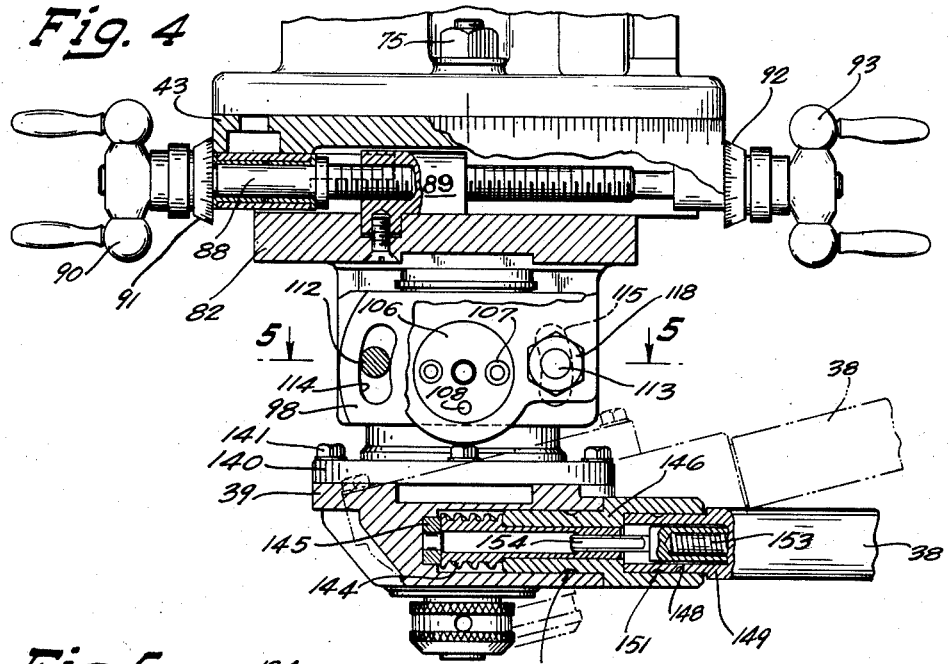
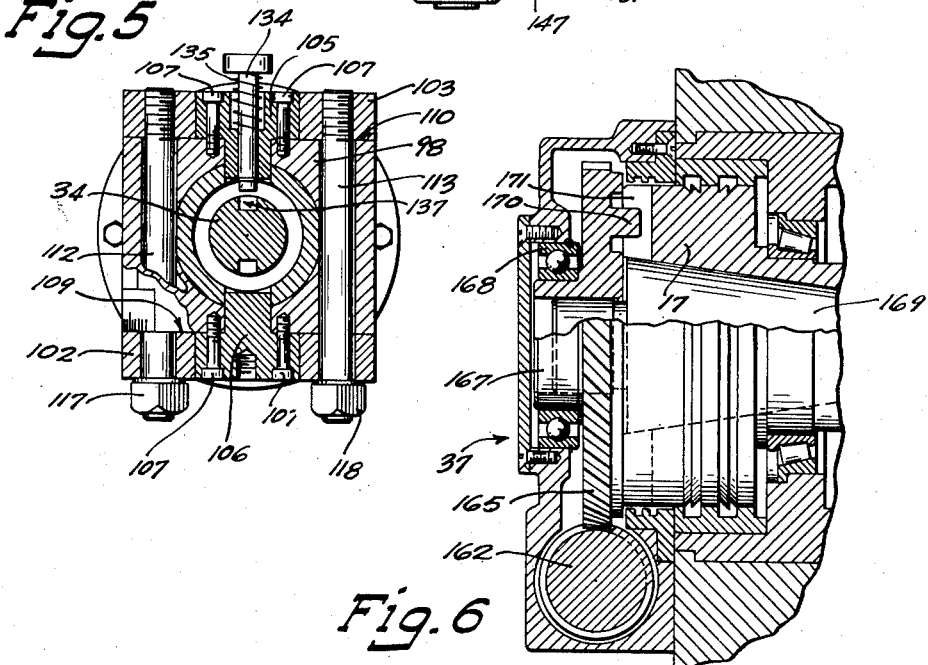

May 20, 1958  O. W. BARKER ET AL  2,835,172
ROTARY HEAD MILLING ATTACHMENT
Filed Jan. 13, 1955  4 Sheets-Sheet 4
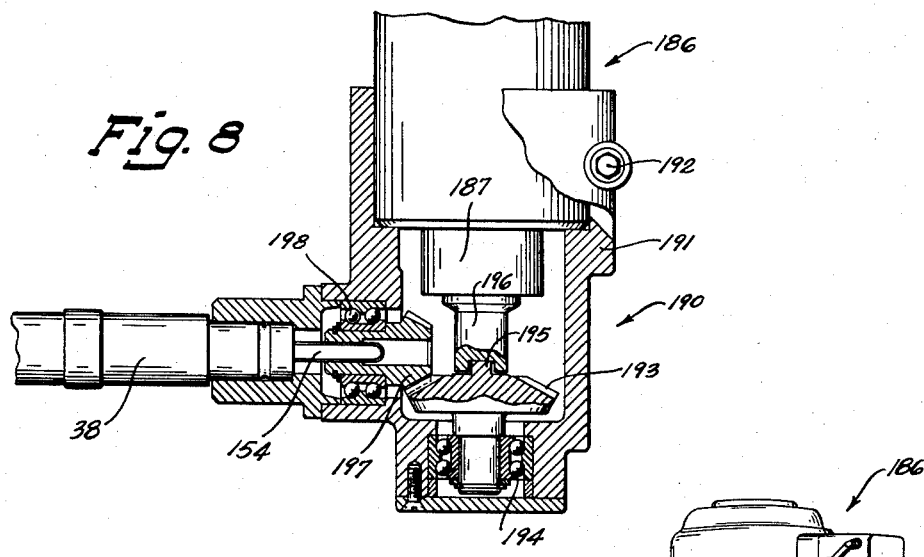
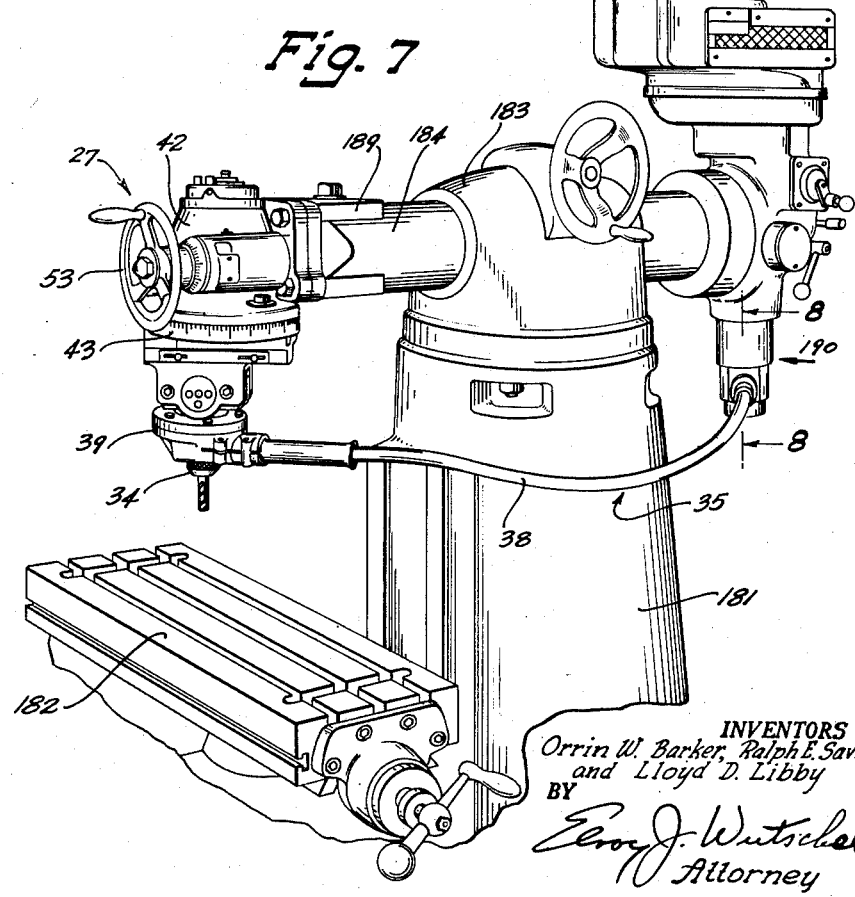
INVENTORS
Orrin W. Barker, Ralph E. Saving,
and Lloyd D. Libby
BY
Elroy J. Wutschel
Attorney United States Patent Office 2,835,172
Patented May 20, 1958

2,835,172

ROTARY HEAD MILLING ATTACHMENT

Orrin W. Barker, New Berlin, and Ralph E. Saving, Wauwatosa, Wis., and Lloyd D. Libby, Minneapolis, Minn., assignors to Kearney & Trecker Corporation, West Allis, Wis., a corporation of Wisconsin Application January 13, 1955, Serial No. 481,676

4 Claims. (Cl. 90—15)

This invention relates generally to machine tools and more particularly to a rotary head milling attachment particularly adapted to be used in conjunction with milling machines for performing intricate milling operations.

The principal object of this invention is to provide an improved rotary head milling attachment.

Another object of the invention is to provide a milling attachment having a vertically depending rotatable tool spindle carried for bodily gyratory and radial movement.

Another object of the invention is to provide improved mounting and driving means for a milling attachment having a tool spindle carried for bodily gyratory movement.

Another object of the invention is to provide an improved milling attachment of the orbitally and radially movable spindle type that is adapted to be removably mounted on and driven by a milling machine.

Another object of the invention is to provide improved power transmitting means for driving the bodily movable rotatable tool spindle of a machine tool.

A further object of the invention is to provide an improved milling attachment that is adapted to convert a milling machine of the standard horizontal spindle knee and column type into a machine arranged to perform intricate milling operations.

A further object of the invention is to provide an improved power take-off mechanism for removably connecting a machine tool spindle to drive a rotatable element of an attachment removably secured to the machine.

A still further object is to provide an improved simplified indexing apparatus for the orbitally movable tool spindle of a milling attachment.

According to this invention a removable milling attachment for a machine tool is provided with a tool spindle that is carried for bodily gyration about a selected radius and for angular adjustment about a pivot axis transverse to the axis of rotation. To this end, the tool spindle is journalled in a carrier that is pivotally mounted within a cross slide movably carried for radial adjustment by a main rotary member journalled to rotate in a frame that is removably secured to a machine by means of an attachment bracket. By means of this arrangement, the attachment spindle can be positioned to rotate about an axis concentric with the axis of rotation of the main member, or can be angularly adjusted relative to its axis of rotation. Likewise, by radially adjusting the cross slide relative to the main rotary member, the latter is rotatable to effect bodily gyration of the tool spindle about the selected radius. A handwheel journalled in the frame is connected to rotate the main member throughout a full 360°, or for any required lesser amount as determined by a selectively adjustable positive stop mechanism. Actuating the handwheel to rotate the main member effects a corresponding bodily gyration of the tool spindle, as well as a cutter carried thereby, to machine a contour of required configuration. To rotate the tool spindle as it is being bodily gyrated, there is provided an improved power transmitting apparatus that is removably connectable to transmit driving power from the machine tool spindle to rotate the attachment spindle. To accomplish this, a geared transmission mechanism pivotally mounted for movement about an axis concentric with the axis of rotation of the attachment spindle is connected to be driven by a flexible driving shaft having its opposite end connected to receive power from a power take-off bracket removably secured to the machine column in a manner to receive driving power from the tool spindle journalled therein.

The transmission mechanism is operative to follow the planetary or gyratory movements of the attachment spindle without following the rotational movements thereof. The transmission mechanism is thus operatively connected to rotate the attachment spindle irrespective of the angular adjustment and bodily movement of the attachment spindle relative to the power take-off bracket. By combining the required radial and gyratory bodily movements of the attachment tool spindle, workpieces of intricate configuration can be completely machined without recourse to the involved set-ups and special fixtures required on conventional standard milling machines. The attachment spindle is adapted to operate upon a workpiece mounted directly upon the usual work supporting table of a knee and column type milling machine or upon a rotary table or dividing head that is in turn carried by the machine table. Inasmuch as a milling machine work table is usually carried for selective movement in three mutually perpendicular planes, it will be readily apparent that the machine tool table is selectively movable to effect corresponding movement of a workpiece carried thereby relative to the attachment tool spindle. By alternately effecting bodily movement of a workpiece mounted upon the table relative to the attachment spindle, and then effecting bodily gyratory and radial movement of the attachment spindle relative to the workpiece, an infinite variety of extremely intricate machining operations can be performed. By means of this attachment mounted in a standard horizontal spindle milling machine, therefore, dies or templates of irregular configuration can be machined without laying out a pattern on the workpiece.

With the rotary head attachment operatively mounted upon a standard horizontal spindle milling machine, the resulting combined machine is operative to perform machining operations that could heretofore be accomplished, with corresponding ease and simplicity, only by special purpose machine tools adapted for this class of work. The foregoing and other objects of this invention, which will become more fully apparent from the following detailed specification, may be achieved by the preferred embodiments constituting exemplifying structure that are depicted and described in connection with the accompanying drawings, in which:

Fig. 3 is an enlarged fragmentary detailed view in front elevation of the upper portion of the machine column showing secured thereto the rotary head attachment, in longitudinal vertical section, and the power take-off bracket, partly in front elevation and partly in vertical section;

Fig. 4 is an enlarged fragmentary detailed view taken partly in side elevation and partly in vertical section with parts broken away to show the operating mechanism;

Fig. 5 is a transverse view in horizontal section taken generally along the lines 5—5 in Fig. 4 and showing the tilting arrangement for the attachment tool spindle;

Fig. 6 is an enlarged fragmentary detailed view, partly in elevation and partly in vertical section, through the power take-off bracket and the forward central portion of the machine and being taken generally along the lines 6—6 in Fig. 1;

Fig. 7 is a view in perspective of the rotary head attachment applied to a machine tool of different construction;

Fig. 8 is a view in horizontal section through a right angled drive take-off bracket shown in Fig. 7 for transmitting power to drive the attachment tool spindle; and, Fig. 9 is a fragmentary top plan view of a portion of the rotary head attachment showing the indexing apparatus.

Figure 1:
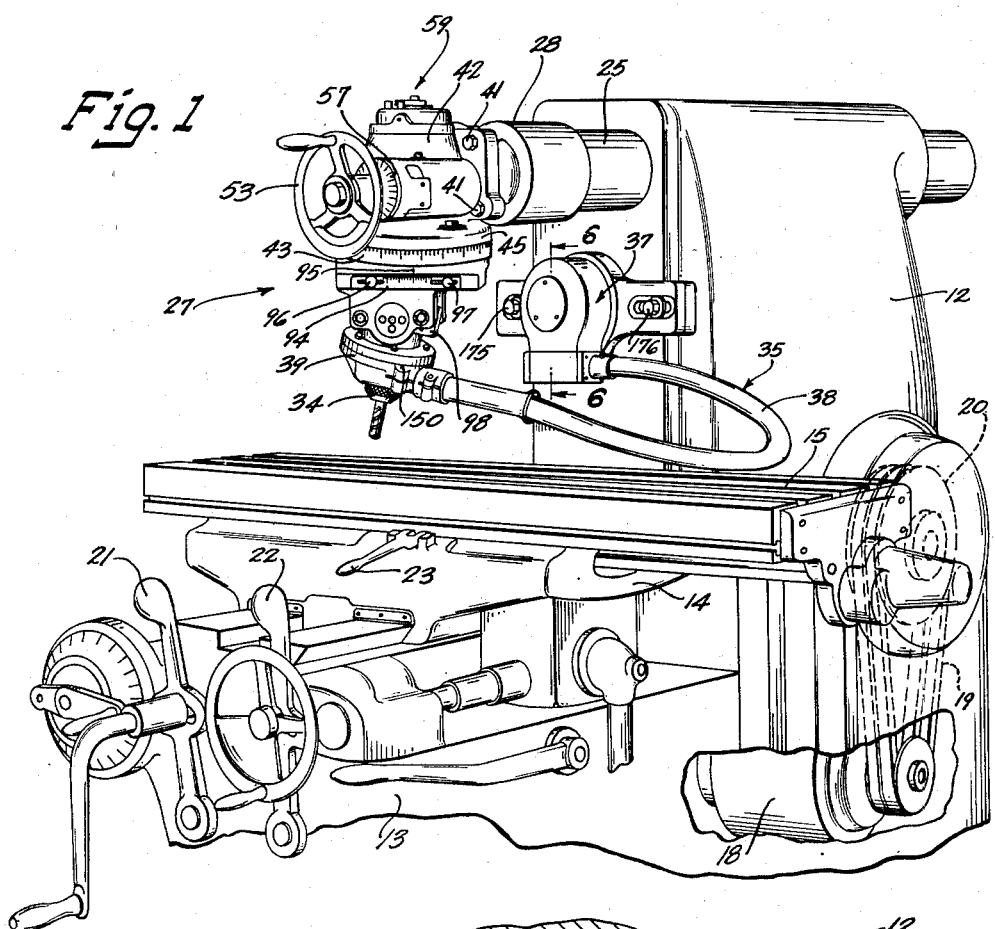
Figure 1 is a view in perspective of the rotary head attachment and power transmitting apparatus operatively mounted upon a standard horizontal spindle type knee and column milling machine, the latter being an enlarged fragmentary view with some parts broken away to show the source of machine driving power.

The milling machine shown in Fig. 1 of the drawings as exemplifying structure incorporating a preferred embodiment of the invention is of the standard horizontal spindle, knee and column type.

Figure 2:
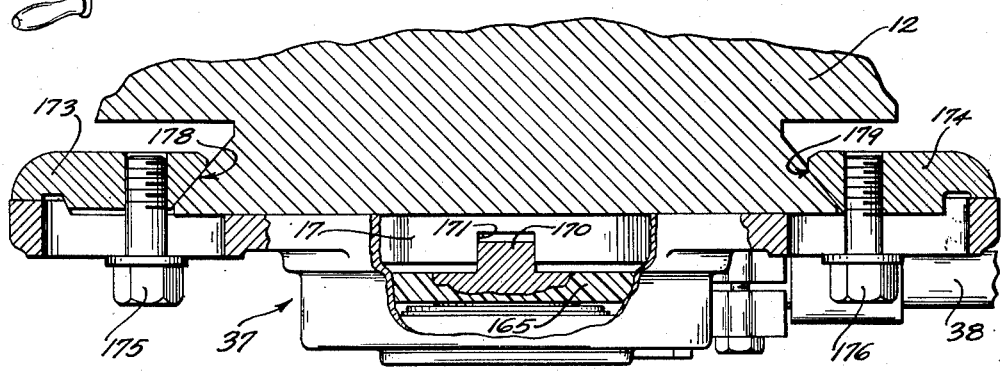
Fig. 2 is an enlarged fragmentary detailed view taken, partly in horizontal section through a portion of the upper forward part of the machine column, and partly in top plan view of the power take-off bracket secured thereto, with parts broken away to show the driving connection to the machine spindle.

Referring more specifically to the drawings and particularly to Fig. 1 thereof, the milling machine there shown comprises essentially an upstanding column 12 to which are movably secured a plurality of slidably superimposed work supporting elements including a vertically adjustable knee 13, a transversely movable saddle 14, and a longitudinally movable work supporting table 15. A horizontally disposed rotatable tool spindle 17, Fig. 2, is journalled in the upper central portion of the column 12 in a manner to support a cutting tool (not shown) in operative work engaging relationship to a workpiece carried for selective work feeding movement on the table 15. As is well known in the art, a workpiece (not shown) mounted on the table 15 may be moved into cutting engagement with a cutter (not shown) mounted in the tool spindle 17 by effecting the required work feeding movement of the knee 13, the saddle 14 or the work table 15. Power for effecting the required feeding movement of the three slidably superimposed work supporting members, as well as for effecting rotational movement of the tool spindle 17, is derived from a main drive motor 18 carried within the hollow column structure 12. From the main drive motor 18, power is transmitted through multiple V-belts 19 to rotate a main drive pulley 20 journalled toward the rightward side of the column 12. Power from the pulley 20 is transmitted to drive a selectively adjustable speed transmission (not shown) carried within the upper portion of the hollow column 12, and that is in turn connectable to rotate the tool spindle 17. Power is likewise transmitted from the main pulley 20 to drive a feed transmission (not shown) carried within the knee 13 which is connectable to drive one or another of the work supporting members by selectively engaging a knee directional lever 21, a saddle directional lever 22, and a table directional lever 23. A pair of circular overarm supports 24 and 25 are slidably carried with suitable bored openings formed in the upper portion of the column 12 for axial movement in parallelism with the tool spindle 17, as shown in Figs. 1 and 3.

A self-contained rotary head milling attachment 27 is carried by an attachment clamping bracket 28 that is removably secured to the machine overarms 24 and 25 in a manner that the entire attachment 27 is movable toward or away from the column 12, and is carried in overlying relationship to the work table 15, as shown in Figs. 1 and 3. The attachment bracket 28 is provided with a pair of suitable bored openings 29 and 30 for receiving the outer ends of the overarms 24 and 25 and is clamped thereto by means of a clamping bolt 31. As will hereinafter be more fully explained, a vertically depending rotatable tool spindle 34 is movably carried by the rotary head attachment 27 for selective angular adjustment relative to its axis of rotation, for bodily radial movement, and for bodily gyratory movement about a selected radius.

For rotating the tool spindle 34, irrespective of its bodily gyratory movement relative to the attachment 27 or the transverse position of the attachment relative to the machine column 12, as shown in Fig. 1, there is provided an improved power transmitting apparatus 35 that is connectable to transmit driving power from the machine tool spindle 17 to rotate the rotary head attachment spindle 34. The power transmitting apparatus 35 comprises essentially a power take-off bracket 37, a flexible driving shaft 38, and a transmission mechanism 39 movably associated with the tool spindle 34 and it is operatively connected to rotate the tool spindle irrespective of its bodily movement relative to the machine column 12. The arrangement is such that with the rotary head attachment 27 and the power take-off bracket 37 secured to the column 12 as shown in Fig. 1 there is provided an improved rotary head milling machine having an orbitally movable tool spindle 34 capable of performing intricate machining operations. With the rotary head attachment 27 and power take-off bracket removed from the column 12, the tool spindle 17 of the milling machine shown in Fig. 1 is operable in the usual manner to perform conventional milling operations.

As shown in Figs. 1 and 3, the principal supporting element for the rotary head milling attachment 27 is a hollow frame 42 which is removably secured to the attachment bracket 28 by means of clamping bolts 41. A main support element or rotary head member 43 is rotatably journalled within the hollow frame 42 in a manner that the upper surface of an annular flange 44 integrally formed therewith is maintained in slidable abutting engagement with the underside of a complementary flange 45 integrally formed with the frame 42. The rotary head member 43 is rotatably supported at its lower end within a bearing 46 having its outer race seated in a bored opening formed toward the lower end of the frame member 42. At its upper end the rotary head member 43 is supported by a bearing 47 having its outer race fitted within a concentrically bored opening at the upper end of the frame 42. To properly preload the concentrically positioned bearings 46 and 47, a clamping collar 49 is threaded on the upper end of the rotary head member 43 into snug engagement with the inner race of the upper bearing 47, thereby preloading the bearings and bringing the flange 44 of the head member 43 into sliding engagement with the flange 45. With the clamp collar 49 threadedly advanced into proper adjusted position relative to the inner race of the upper bearing 47, a clamp screw 50 mounted for radial adjustment in the clamp collar 49 is actuated to engage the rotary head member 43.

To selectively control rotational movement of the head member 43, as shown in Fig. 1, there is provided a handwheel 53 journalled for rotation toward the front central portion of the frame 42. The handwheel 53 is operative to rotate a worm 54, Fig. 3, journalled in the frame and having meshing engagement with a worm wheel 55 secured to the central portion of the rotary head member 43 by means of a key 56. The handwheel 53 is rotatable to effect a corresponding rotation of the rotary head member 43 throughout a full 360°. To determine the extent of rotatable movement of the head member 43 within the frame 42, a graduated index dial 57, Fig. 1, is affixed to the handwheel 53 and is provided with calibrations adapted to be read against a zero mark scribed on the frame 42. In addition to this, the outer peripheral face of the flange 44 integrally formed with the head member 43 is provided with indicia adapted to be read against a zero mark scribed on the peripheral face of the adjacent flange 45 integrally formed with the frame 42.

To limit movement of the rotary head member 43 to any selected segment of a circle, there is provided at the top of the rotary head attachment 27 an improved indexing apparatus 59, as shown in Figs. 3 and 9. The upper end of the rotary head member 43 is provided with a radial slot in which is slidably mounted for radial adjustment a movable stop member 61. The stop member 61 is in turn provided with an elongated slot 62 through which extends a clamp screw 63 that engages a threaded hole formed in the upper end of the rotary head member 43. With the movable stop 61 clamped to the upper end of the rotary head member 43, as shown in Figs. 3 and 9, the outer end thereof is disposed to coact with a pair of adjustably positionable positive stops 65 and 67 fixedly clamped to the frame 42 in order to predeterminately limit rotational movement of the member 43. Each of the positive stops 65 and 67 consists of a socket-headed circular clamping nut disposed to threadedly engage the upper end of a clamping bolt 71 having an enlarged squared lower end slidably carried within a circular T-slot 68 formed in the upper face of the frame 42. Thus, the positive stops 65 and 67 are adjustably positionable to be engaged by the outwardly extending end of the movable stop 61 for limiting rotational movement of the rotary head member 43. In the event that it is necessary to move the rotary head member throughout a full 360° of rotation, the clamping bolt 63 can be released in order to position the movable stop 61 centrally relative to the member 43 and the positive stops 65 and 67, as indicated by the dotted line showing in Fig. 9. With the clamping screw 63 actuated to lock the movable stop 61 in a central position, the handwheel 53, Fig. 1, can then be manipulated to effect rotation of the member 43 throughout a full 360° of rotation.

For certain types of operations, it is necessary to fixedly clamp the rotary head member 43 to the supporting frame 42. To effect this result, a circular T-slot 72 formed in the upper face of the rotary head flange 44 is disposed to be engaged by the enlarged squared lower ends of a plurality of clamping bolts 73 having their shanks extending upwardly through a plurality of circumferentially spaced bored holes 74 formed in the adjacently positioned frame member flange 45. At their upper ends, each of the circumferentially spaced clamping T-slots 73 is disposed to be engaged by a clamping nut 75, each of which is actuatable to urge the flange 44 formed with the rotary head member 43 into clamping engagement with the flange 45 formed on the frame 42. By means of this arrangement, the rotary head member 43 may be securely clamped to the supporting frame 42 in any selected position of angular adjustment about its vertical axis of rotation.

To provide for radial or transverse adjustment of the tool spindle 34, the underside of the rotary head member 43 is provided with a radially formed dove-tailed guideway 77 having compound angularly tapered sides. A pair of compound angularly tapered gibs 78 and 79 are adjustably positionable adjacent the oppositely tapered angular sides of the dove-tailed guideway 77 formed in the head member 43 in a manner to slidably engage with their inner faces a dove-tailed guide member 81 integrally formed with a cross slide 82. The cross slide 82 is thereby retained in depending relationship to the rotary head member 43 for selective radial or transverse adjustment relative to the rotational axis thereof. The gibs 78 and 79 are of the compound angular tapered type, and carried for movable adjustment in opposite directions relative to the frame 42 by means of the usual adjusting screws (not shown). Thus, by an appropriate adjustment of the gibs 78 and 79, the entire cross slide 82 is bodily movable either rightwardly or leftwardly relative to the axis of the head member to compensate for wear and effect a selective adjustment of the cross slide position relative to the axis of the main rotary supporting member 43. For clamping the cross slide 82 in a selected position of radial adjustment, a clamp handle 84 is arranged to rotate a clamp screw 85 that threadedly engages a tapped opening in the rotary head member 43. The inner end of the clamp screw 85 is disposed to engage a clamp element 86 carried for axial movement within a circular bored opening formed in the rotary head member and having an angularly tapered inner end disposed to abut the outer face of the gib 78. Thus, the clamp handle 84 is operative to actuate the clamp element 86 to urge the gib 78 into clamping engagement with the cross slide 82.

To effect radial or transverse adjustment of the cross slide 82 as shown in Figs. 3 and 4, a feed screw 88 journalled at one end in a depending bracket secured to the rotary head member 43 is disposed to engage with its threaded portion a feed nut 89 that is fixedly secured to the cross slide 82. A hand crank 90 attached to one outer end of the feed screw 88 is operative to rotate the screw for effecting the required radial adjustment of the cross slide relative to the rotary head member 43. A graduated dial 91 secured to the outer end of the screw shaft 88 is provided with indicia adapted to be read against a zero mark scribed on the rotary head member 43 to indicate the radial displacement on the cross slide 82. Another index dial 92 and hand crank 93 are secured to the opposite end of the feed screw 88 to effect similar radial adjustment of the cross slide. Thus, regardless of the rotational position of the cross slide 82 relative to the front face of the column 12, one or another of the hand cranks 90 and 93 is accessible to effect radial adjustment of the cross slide. In addition to the index dials 91 and 92, there is also provided an adjustable scale 94 that is adjustably secured to a side face of the cross slide 82 in a manner that indicia carried thereby may be read against a zero mark 95 scribed on the rotary head member 43. A pair of clamp screws 96 and 97 extending through spaced apart elongated slots formed in the scale 94 threadedly engage the cross slide 82 in a manner to clamp the scale 94 to the cross slide in the required longitudinally adjusted position.

To provide for angular as well as radial bodily movement, as shown in Figs. 4 and 5, the tool spindle 34 is journalled to rotate in a spindle carrier or swivel-block 98 that is carried for pivotal adjustment between a pair of spaced apart depending arm members 102 and 103 integrally formed with the cross side 82. A pair of trunnions 105 and 106 respectively secured to the opposite sides of the spindle carrier 98 are provided with enlarged circular ends fitted within a pair of concentrically formed bored openings respectively provided in the depending arm members 102 and 103. The trunnions 105 and 106 are respectively secured to the opposite sides of the spindle carrier 98 by means of screws 107 and dowels 108. At its opposite sides the spindle carrier 98 is provided with flat bearing surfaces 109 and 110, as shown in Figs. 3 and 5, having sliding engagement with the opposite inner faces of the depending arm members 102 and 103 of the cross slide 82. For clamping the spindle carrier 98 in a selected position of angular adjustment relative to the cross slide 82, the inner faces of the arm members 102 and 103 are urged into clamping engagement with the respective flat bearing surfaces of the spindle carrier by means of a pair of clamping studs 112 and 113, as shown in Fig. 5. The clamping studs 112 and 113 extend through a pair of circular bored openings formed in the depending arm member 102, and at their opposite ends are fixedly threaded in a pair of tapped openings formed in the arm member 103 in concentric relationship to the respective circular openings in the arm member 102. The central or shank portions of the clamping studs 112 and 113 extend through a pair of arcuate slots 114 and 115 respectively formed in the spindle carrier 98 to permit pivotal angular adjustment of the spindle carrier about the horizontal axis defined by the trunnions 105 and 106. A pair of clamp nuts 117 and 118 threaded on the clamping studs 112 and 113 provide means for urging the opposite depending arm members 102 and 103 into equalized clamping engagement with the spindle carrier 98.

Within its central portion, the spindle carrier or swivel-block 98 is provided with an enlarged circular opening adapted to receive at its upper end a flanged bearing carrier 120 and at its lower end another flanged bearing carrier 121, as shown in Fig. 3. The bearing carriers 120 and 121 are respectively disposed to support the outer races of an upper spindle bearing 123 and a lower spindle bearing 124, the inner races of which rotatably support the tool spindle 34. A helical spindle driving gear 125 is keyed to the tool spindle 34 in a manner that its opposite faces are maintained in abutting engagement between a peripheral flange presented by the tool spindle and the inner race of the lower spindle bearing 124. An adjustable lock nut 126 is threaded on the upper end of the spindle 34 into abutting engagement with the inner race of the upper spindle bearing 123 and clamped to the spindle in adjusted position by means of a clamp screw 127. By means of this arrangement the bearings 123 and 124 are retained in adjustment for rotatably supporting the tool spindle 34. A cover 128 is removably secured to the upper bearing carrier 120 to retain lubricant within the spindle assembly.

At its lower end the tool spindle 34 is provided with a tool retaining spring collet holder 130 that is operable in a well known manner to releasably carry a cutting tool. To restrain the spindle 34 against rotation while inserting or removing a cutting tool, as shown in Figs. 3 and 5, a locking plunger 134 is slidably carried for axial movement within a bored opening formed in the trunnion 105 concentric with the pivot axis for effecting angular adjustment of the tool spindle. The plunger 134 is normally biased outwardly by means of a spring 135 to maintain the inner opposite end of the plunger in disengaged or unclamped position. Depressing the locking plunger 134 operates to urge the inner end thereof into clamping engagement with one of a plurality of radial notches 137 formed in the central part of the tool spindle 34 to restrain the spindle against rotation and facilitate clamping a cutting tool within the tool receiving collet 130 carried thereby.

For rotatably driving the tool spindle 34 irrespective of its radial or gyratory movements, the hollow transmission housing 39 is pivotally secured to a circumferential flange 139 integrally formed with the lower bearing carrier 121 by means of an annular bearing ring 140 that is secured to the upper portion of the housing by means of a plurality of circumferentially spaced cap screws 141. The hollow housing 39 and the annular bearing ring 140 removably attached thereto are thereby rotatably carried by the peripheral flange 139 integrally formed with the bearing carrier 121 for rotation about an axis concentric with the axis of rotation of the tool spindle. A slinger and lubricant seal 142 formed with a bored circular opening encircling the lower end of the tool spindle 34 is removably secured within an enlarged opening formed at the lower underside of the hollow housing 39.

As shown in Figs. 3 and 4, a helical drive gear 144 journalled within the hollow housing 39 is adapted to meshingly engage the gear 125 keyed to the tool spindle 34. At its inner end the gear 144 is provided with a pilot extension rotatably supported in a bearing 145 carried within a circular recess formed in the housing 39. A circular outer shaft of the gear 144 is rotatably supported within an input coupling socket 146, the inner end of which is supported within a circular opening formed in the housing 39. As shown in Figs. 1 and 4, an annular groove 147 presented toward the inner end of the socket 146 is adapted to be engaged by a clamp screw 150 to retain the socket 146 within the bored opening presented by the housing 39. At its outer end, the socket 146 is provided with an enlarged circular opening 148 for receiving one end 149 of the flexible drive shaft 38. The end portion 149 of the shaft 38 is provided with a groove 151 that is likewise engaged by a clamp screw (not shown). The flexible shaft 38 comprises an outer hollow tubular housing that is adapted to rotatably support an inner rotatable driving core 153 having a squared driving end 154 adapted to engage a squared opening formed in the outer end of the shaft for the gear 144. Thus, the rotatable core 153 within the hollow tubular housing for the flexible driving shaft 38 is connected to rotate the gear 144 which in turn drives the gear 125 and tool spindle 34.

At its opposite end, the flexible driving shaft 38 is provided with an end portion 155 of reduced diameter adapted to be removably received within a circular socket formed in a bearing retainer 156 secured within a circular opening in the drive bracket 37, by means of cap screws (not shown). The end portion 155 of the shaft 38 is likewise provided with an annular groove 157 that is releasably engaged by a clamp screw 158. A square end 159 secured to the rotatable core 153 is engaged by a complementary square hole formed in a drive sleeve 160 secured within a circular opening formed in the elongated hub of a driven helical gear 162. The gear 162 is rotatably carried at its opposite ends within a pair of bearings 163 and 164 respectively positioned within a cylindrical bored opening formed in the lower portion of the power take-off drive bracket 37. The outer race of the bearing 163 is engaged by a tubular spacer sleeve 161 that is retained within the bored opening by a cap 172 that is secured to the drive bracket 37 by means of cap screws (not shown). Thus, both outer faces of the outer races of the bearings 163 and 164 are respectively engaged by the spacer sleeve 161 and the bearing retainer 156. To prevent endwise axial movement of the bearings 163 and 164, the opposite faces of the inner races thereof are adapted to abut flanged shoulders respectively formed toward the opposite ends of the shaft integrally formed with the gear 162. The arrangement is such that the entire assembly, including the gear 162 and drive sleeve 160 together with the bearings 163 and 164, is reversibly positionable within the bored opening formed toward the lower portion of the drive bracket 37.

This can be accomplished by first detaching the end portion 155 of the flexible shaft 38 from the bearing retainer 156 and then removing the bearing retainer 156, as well as the tubular spacer sleeve 161 and cap 172 from the drive bracket 37. The assembly comprising the gear 162, drive sleeve 160 and bearings 163 and 164, is then removed from the bore within the bracket 37, and reversibly replaced therein in a manner that the drive sleeve 160 is at the leftward end of the bore instead of at the rightward end (as now indicated by the solid lines). Likewise, the sleeve 161 and cap 172 are reassembled to the drive bracket 37 at the opposite or rightward end of the bore. In a similar manner, the bearing retainer 156 is reassembled to the bracket at the leftward end of the bored opening formed in the drive bracket 37 as indicated by the dotted lines in Fig. 3. With the end portion 155 of the flexible shaft 38 reassembled to the bearing retainer 156, as indicated in Fig. 3 by the dotted lines, the entire flexible shaft 38 is positioned leftwardly of the drive bracket 37 instead of rightwardly thereof, as shown by the solid lines in Figs. 1 and 3. By interchanging the position of the flexible shaft 38 relative to the drive bracket 37 (either rightwardly or leftwardly), the shaft 38 can be advantageously placed for performing a particular operation. In either case, the gear 162 is in operatively intermeshing engagement with a helical drive gear 165 connected to be driven by the tool spindle 17.

To provide further flexibility in positioning the flexible shaft 38 to obtain the maximum advantage and convenience in performing a particular milling operation, the entire power take-off drive bracket 37 is reversibly positionable on the front face of the column 12. In other words, the drive bracket 37 can be so secured to the column 12 that the driven gear 162 is above the driving gear 165 instead of below it as shown in Fig. 3. It will be apparent therefore that by interchanging the position of the gear 162 and sleeve 160 with respect to the bracket 37 and the position of the drive bracket 37 with respect to the column 12, the flexible shaft can be placed in one of four different operating positions.

As shown in Figs. 2, 3 and 6, the gear 162 has meshing engagement with the helical gear 165 that is connected to be driven by the tool spindle 17 of the machine. The gear 165 is provided with a forwardly extending hollow pilot end 167 that is rotatably carried by the inner race of a bearing 168 mounted within the drive bracket 37. The gear 165 is provided with a bored opening within the pilot end or hub 167 that is mounted upon the outwardly extending circular end of a centering plug 169 secured within the tool spindle 17 in well known manner. At its inner side face, the gear 165 is provided with rearwardly extending, circumferentially spaced driving lugs 170 that are adapted to engage radially extending driving slots 171 formed in the front face of the tool spindle 17.

To retain the gear 165 in driven engagement with the tool spindle 17, the drive bracket 37 is fixedly secured to the front face of the machine column 12. To fasten the drive bracket 37 to the column, a pair of gibs 173 and 174, shown in Fig. 2, are bolted to the outer rearward portions of the driving bracket by means of clamp bolts 175 and 176 respectively. The clamping gibs 173 and 174 are respectively provided with inner angular faces 178 and 179 that are urged into clamping engagement with the angularly formed dove-tailed way surfaces provided adjacent the front face of the column 12.

With the drive bracket 37 bolted to the front face of the column 12 as shown in Figs. 1 and 2, the machine tool spindle 17 is connected to transmit driving power for operating the attachment spindle 34 irrespective of the bodily movements of the attachment tool spindle relative to the attachment frame 42 or the front face of the column 12. The flexible shaft 38 operates to transmit power from the drive bracket 37 to rotate the attachment spindle 34 irrespective of axial movement of the overarms 24 and 25 to effect bodily movement of the entire rotary head attachment 27 toward or away from the column 12. Likewise, due to the pivotal mounting of the transmission 39 on the flange bearing carrier 139, as shown in Fig. 3, the flexible shaft 38 operates to rotate the tool spindle 34 regardless of the angular adjustment of the spindle carrier 98 within the depending arms of the cross slide 82 or during radial adjustment of the cross slide 82 relative to the main rotary head member 43. With the cross slide moved to offset the attachment spindle relative to the rotational axis of the main member 43, the spindle 34 is connected to be rotated as it is bodily gyrated by rotating the handwheel 53 to turn the main member 43. During bodily gyratory movements of the tool spindle 34, the pivotally mounted transmission mechanism 39 is operative to follow the movement of the tool spindle without interfering with the freedom of the allowable movement thereof. The transmission mechanism 39 partakes of the gyratory, but not the rotational, movements of the tool spindle 34.

With the rotary head attachment 27 and drive bracket 37 secured to the machine column 12 as shown in Fig. 1, it will be apparent that the resulting combined machine is provided with a tool spindle 34 capable of bodily radial, tiltable and planetary or gyratory movements in combination with a work table 15 that is selectively movable in a plurality of three mutually perpendicular planes. By combining the required movements of the work table 15 with the necessary movements of the tool spindle 34, an extremely wide variety of intricate machining operations can be accomplished. The rotary head attachment 27 and drive bracket 37 therefore considerably enlarges the scope of useful operation of a standard milling machine such as that shown in Fig. 1. In operating the combined machine shown in Fig. 1, a workpiece mounted on the table 15 is advanced into cutting engagement with a cutter (not shown) mounted in the attachment spindle 34 by effecting vertically upward movement of the knee 13. With a cutter engaging the work, a contour of irregular configuration can be generated by alternately feeding the table 15 in the required direction and effecting bodily radial or orbital movement of the attachment spindle 34. Thus, a workpiece having a configuration combining straight and arcuate shapes, with vertical or tapered sidewalls, can be generated simply by effecting the required settings and movements of the rotary head attachment 27 and machine table 15. With the attachment 27 and drive bracket 37 removed from the machine column 12, the machine shown can be utilized for standard milling machine operations in well known manner.

The rotary head attachment 27 can likewise be secured to and operated in conjunction with a wide variety of machine tools. As shown in Fig. 7 for example, the rotary head attachment 27 is mounted on a machine tool provided with a supporting column 181 and a movable work supporting table 182. At the top of the column 181, a turret head 183 is mounted for pivotal movement about a vertical axis and is disposed to carry a single horizontally disposed circular support member 184. At one end of the support member 184 there is mounted a milling head 186 that is provided with a selectively rotatable power driven tool spindle 187, Fig. 8. At the opposite or forward end of the support member 184, there is secured a modified form of an attachment bracket 189 to which in turn is secured the rotary head milling attachment 27. As hereinbefore more fully described, the rotary head milling attachment 27 is operative to effect bodily radial and gyratory movement of the tool spindle 34 relative to a workpiece (not shown) that may be carried on the work supporting table 182. To drive the tool spindle 34, the transmission mechanism 39 pivotally mounted thereon is connected by means of a flexible driving shaft 38 to receive power from a modified form of power take-off bracket 190 that is removably secured to the depending lower end of the milling head 186.

As shown in Fig. 8, the modified drive bracket 190 comprises a hollow housing 191 that is removably secured to the lower end of the milling head 186 by means of a clamp bolt 192. Within the housing 191, a bevel gear 193 journalled in a bearing 194 is provided with an upstanding driving lug 195 that is engaged by an adaptor 196 carried by the tool spindle of the milling head 186. From the bevel gear 193, power is transmitted to rotate a complementary meshing bevel gear 197 journalled in a bearing 198 and that is provided with a squared opening in its hub adapted to engage the driven input squared end 154 of the flexible driving shaft 38. Thus, the driving motor, variable speed transmission, and tool spindle of the milling head 186 are connectable to drive the rotary head attachment spindle 34 irrespective of its bodily movements relative to the supporting frame 42 and the turret 183.

From the foregoing detailed description of the construction and operation of the several illustrative embodiments of the invention, it will be apparent that there has been provided an improved mounting arrangement and driving apparatus for a tool spindle that is carried for bodily radial and gyratory movement and that is particularly adapted for performing intricate milling operations.

While the invention has been shown and described as a separate attachment adapted to be mounted on and driven by a milling machine, it is to be understood that the various inventive features may be incorporated in similar or somewhat modified form in other similar structures or incorporated directly into a milling machine as a part of the operating mechanism. Although several exemplary embodiments have been shown and described in considerable detail for the purpose of disclosing the manner in which the invention may be practiced, it will be apparent to those skilled in the art to which this invention relates that the various novel features may be incorporated in other structural forms without departing from the spirit and scope of the invention as defined in the subjoined claims.

The principles of this invention having now been fully explained in connection with the foregoing description, we hereby claim as our invention:

1. In combination with a milling machine of the knee and column type, said machine being provided with a vertically upstanding column, a power driven horizontal tool spindle rotatably journalled in said column, and a horizontal overarm structure slidably carried by said column for horizontal movement in parallelism with said tool spindle; a milling attachment removably secured to said overarm structure for bodily movement in a horizontal plane, said attachment comprising a frame, a main member rotatably journalled in said frame; means connected to effect selective rotational movement of said member relative to said frame, a cross slide movably carried by said member for radial adjustment, a tool spindle rotatably carried by said cross slide adapted to be rotatably driven irrespective of the radially adjusted position of said cross slide relative to said member; said attachment tool spindle being carried for bodily gyratory movement whenever said member is rotated with said cross slide in a radially offset position, a transmission mechanism pivotally associated with said cross slide being operatively connected to rotate said attachment spindle; and a reversibly positionable power transmitting apparatus connectable to transmit driving power from the said tool spindle of said machine to said transmission mechanism for rotating said attachment tool spindle, said power transmitting apparatus comprising a hollow power take-off bracket removably secured to said column of said machine, said bracket being provided with a horizontal bore perpendicular to the axis of said spindle and opening at its central part into the hollow central portion of said bracket, a helical driving gear journalled within said bracket and being maintained thereby in driven engagement with said spindle, a helical driven gear journalled in the horizontal bore formed in said bracket in a position to be engaged by said helical driving gear, an adapter coupling secured to one end of said helical driving gear, and a flexible power transmitting shaft operatively interconnected to transmit power from said coupling to said transmission mechanism for driving said attachment spindle.

2. In combination with a machine tool provided with a column and a power driven tool spindle, a power take-off bracket comprising a hollow housing removably secured to said machine tool in overlying relationship to the rotatable tool spindle thereof, a helical drive gear journalled in said housing being removably connectable to be driven by said tool spindle, said housing being provided with a cylindrical bored opening transverse to the rotational axis of said gear and being provided with a laterally formed opening in proximity to the periphery of said gear, a helical driven gear journalled within the cylindrical bored opening presented by said housing in position to be operatively driven by said helical drive gear, removable positioning means connected to retain said helical driven gear in operatively meshing engagement with said helical drive gear, an adaptor coupling secured to one of the end hubs of said helical driven gear, a flexible power transmitting shaft connected at one end to be driven by said adaptor coupling, said helical driven gear and said adaptor coupling being reversibly positionable as a single unit within the cylindrical bored opening formed in said housing whereby said flexible shaft is operatively connectable to receive driving power from either end of the cylindrical bored opening formed in said housing, and a rotatable driven element connected to be driven by the opposite output end of said flexible shaft.

3. In combination with a machine tool provided with a vertically upstanding column and a power driven tool spindle journalled in said column, a power take-off bracket adapted to receive power from said tool spindle and comprising a hollow housing reversibly and removably secured to said column in overlying relationship to the extending end of said power driven tool spindle, a helical drive gear journalled at one end in said housing and being connectable to be driven by said tool spindle in either of the reversibly secured positions of said housing on said column, said housing being provided with a bored opening transverse to the axis of said drive gear and having a lateral opening adjacent said drive gear, a helical driven gear journalled within the bored opening in said housing in position to be operatively driven by said drive gear, removable means operatively connected to retain said driven gear in meshing engagement with said drive gear, an adapter coupling secured to one of the outwardly extending end hubs of said helical driven gear, said helical driven gear and said adapter coupling being reversibly positionable within the bored opening formed in said housing in a manner that power can be taken in either direction from said housing, a flexible drive shaft connected to be driven by said adapter coupling, and a bodily movable driven element connected to be driven by the output end of said flexible shaft whereby said adapter coupling and the input end of said shaft can be moved to one of four different positions by selectively reversing the position of said housing on said column and by reversing the position of said driven gear within the bored opening formed in said housing.

4. In combination with a machine tool having a column and a power driven tool spindle journalled in said column, a hollow housing reversibly secured to said column in overlying relationship to the extending end of said tool spindle, a helical drive gear journalled in said housing and being connected to be driven by said tool spindle irrespective of the reversibly secured position of said housing on said column, said housing being provided with a horizontal bore transverse to the axis of said drive gear and having a laterally formed opening adjacent the periphery of said drive gear, a helical driven gear reversibly journalled in the bore formed in said housing in a manner to be driven by said helical drive gear, removable means disposed to retain said driven gear in meshing engagement with said drive gear irrespective of its reversibly journalled position within the bore in said housing, and a flexible power transmitting drive shaft coupled to receive driving power from one of the end hubs of said reversibly positionable helical driven gear.

References Cited in the file of this patent

UNITED STATES PATENTS

| | | |
|---|---|---|
| 825,409 | Parker | July 10, 1906 |
| 1,930,796 | Garbutt et al. | Oct. 17, 1933 |
| 1,938,362 | West | July 31, 1934 |
| 2,129,307 | Moo | Sept. 6, 1938 |
| 2,275,291 | Bannoev | Mar. 3, 1942 |
| 2,286,821 | Libby | June 16, 1942 |
| 2,340,210 | Armitage | Jan. 25, 1944 |
| 2,341,061 | Rhodes et al. | Feb. 8, 1944 |
| 2,372,341 | Shanley | Mar. 27, 1945 |
| 2,499,842 | Armitage | Mar. 7, 1950 |